United States Patent [19]

Kaufhold

[11] Patent Number: 4,884,181

[45] Date of Patent: Nov. 28, 1989

[54] METHOD AND ARRANGEMENT FOR CONTROLLING A HIGH VOLTAGE D-C TRANSMISSION SYSTEM

[75] Inventor: Wolfgang Kaufhold, Erlangen, Fed. Rep. of Germany

[73] Assignee: Siemens Aktiengesellschaft, Munich, Fed. Rep. of Germany

[21] Appl. No.: 230,894

[22] Filed: Aug. 11, 1988

[30] Foreign Application Priority Data

Aug. 26, 1987 [DE] Fed. Rep. of Germany ....... 3728512

[51] Int. Cl.$^4$ .............................................. H02J 3/36
[52] U.S. Cl. ...................................... 363/35; 363/79; 363/87; 363/96
[58] Field of Search ................... 363/35, 37, 51, 78, 363/79, 84–88, 95, 96

[56] References Cited

U.S. PATENT DOCUMENTS

| | | | |
|---|---|---|---|
| 4,494,179 | 1/1985 | Inokuchi et al. | 363/35 |
| 4,516,198 | 5/1985 | Liss | 363/35 |
| 4,578,743 | 3/1986 | Inokuchi et al. | 363/35 |
| 4,649,466 | 3/1987 | Rogowsky | 363/35 |
| 4,685,044 | 8/1987 | Weibelzahl et al. | 363/35 |
| 4,727,467 | 2/1988 | Bendl et al. | 363/35 |

FOREIGN PATENT DOCUMENTS

| | | | |
|---|---|---|---|
| 0146728 | 10/1984 | European Pat. Off. | |
| 0049523 | 4/1979 | Japan | 363/35 |

Primary Examiner—Peter S. Wong
Attorney, Agent, or Firm—Kenyon & Kenyon

[57] ABSTRACT

In the rectifier station (GR), the reference d-c current ($J_w$) is automatically formed from the differences of a reference current-dependent control angle function and the current controller-dependent control angle (A) on the rectifier side, where the actual d-c current ($J_d$) is termined by the power-dependent bucking voltage in the inverter state (WR), and that in the latter the difference of the actual d-c current ($J_d$) and a reference d-c current obtained from the reference power ($P_W$) through division by the actual d-c voltage ($U_d$) influences a controller which sets the reference d-c current for the voltage controller (UR) in the inverter station (WR).

4 Claims, 2 Drawing Sheets

METHOD AND ARRANGEMENT FOR CONTROLLING A HIGH VOLTAGE D-C TRANSMISSION SYSTEM

BACKGROUND OF THE INVENTION

A. Field of Invention

This invention relates to a method for controlling a High Voltage D-C (HVDC) transmission system as well as an arrangement for carrying out the method.

B. Description of the Prior Art

Normally, the power of a HVDC transmission line is controlled either from a central location, or from the rectifier station remote from the consumer. In such systems remote control means for setting current reference values in normal operation are required.

OBJECTIVES AND SUMMARY OF THE INVENTION

It is an object of the invention to provide a control method for a HVDC transmission system which the transmitted power, without a central location and without separate telecommunication means. This is accomplished by controlling the transmission system from the inverter station near the consumer. The process also facilitates maintaining the network voltage constant in a simple and reliable manner.

In contrast to the normal control systems, the active power delivered to a three-phase distribution network according to the invention is controlled from the feeding inverter station alone and the rectifier station of the HVDC system adjusts itself automatically on the basis of preselected criteria specific to the required system without direct influence of its own on the power control and on keeping the network voltage. For this purpose, for each d-c current is assigned a control angle A in such a manner that large control angles (A≦60') correspond to small d-c values and small control angles (A≦20') correspond to large d-c values, whereby a considerably smaller change of the reactive control and commutation power is obtained.

Accordingly, only one power control is associated with the inverter station and only the current control for the control angle A is retained for the rectifier station. The control angle A corresponds to the phase angle at which thyristors within the rectifier are conductive.

In HVDC systems with several inverter and rectifier stations, all inverter stations are provided with power controls.

BRIEF DESCRIPTION OF THE INVENTION

An embodiment example of a control arrangement for carrying out the method according to the invention is shown simplified in FIGS. 1A and 1B and will be explained in greater detail in the following.

The two three-phase networks as well as the transformers and filter circuits coupling them to the recitifier and inverter stations as well as compensation apparatus are not shown since they are not needed for an understanding of the invention.

DETAILED DESCRIPTION OF THE INVENTION

Figure 1A:
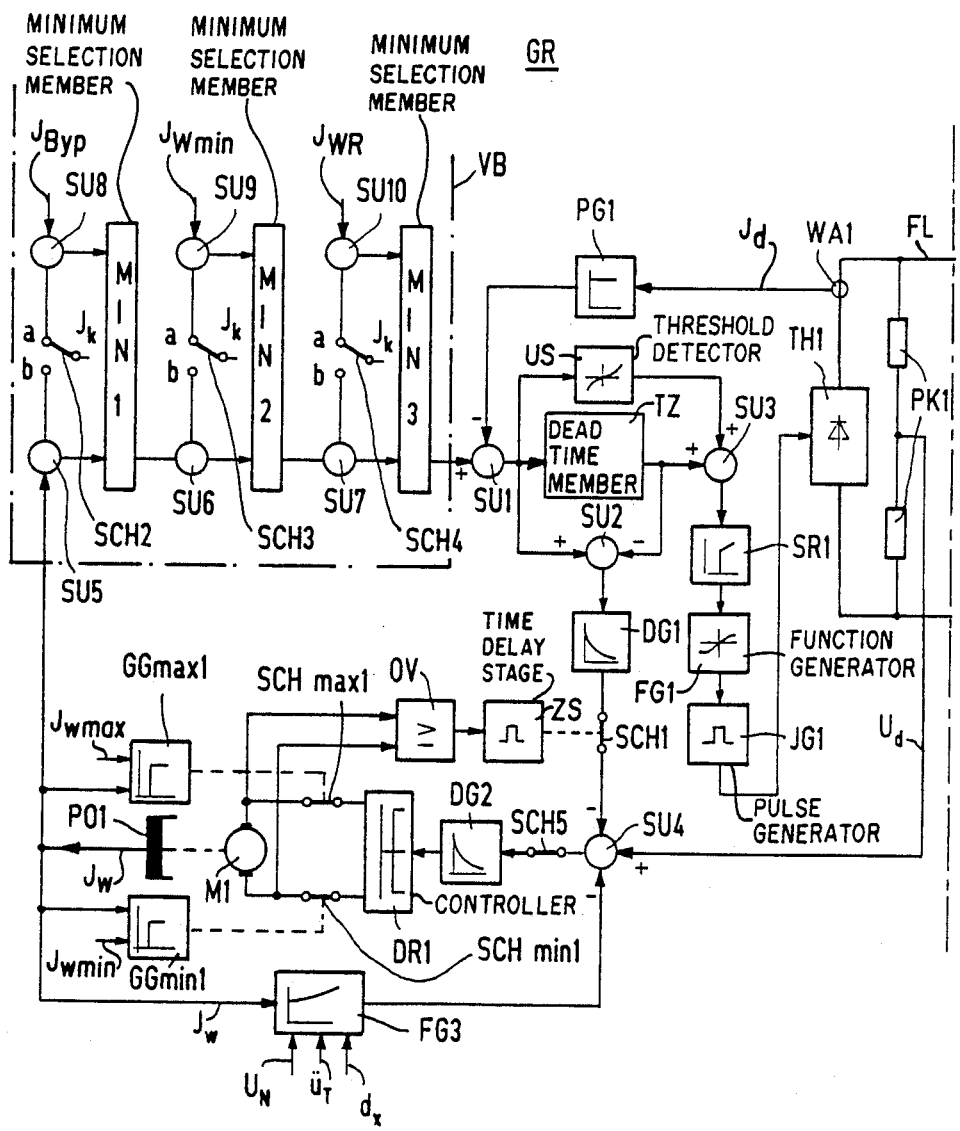
Figure 1B:
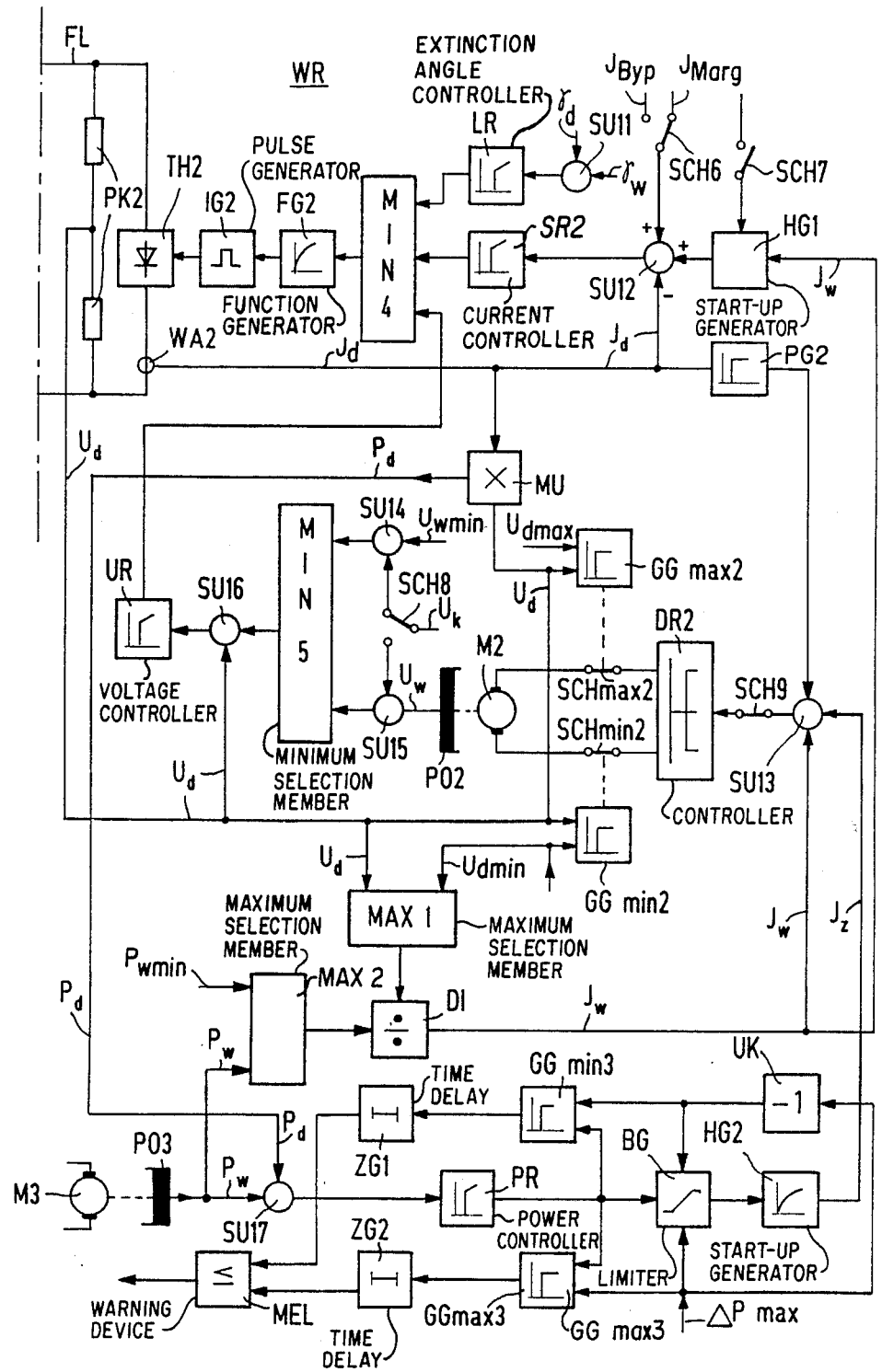

In the rectifier station GR, there is provided a controlled rectifier TH1 and similarly in the inverter station WR, there is provided a controlled inverter TH2, which are interconnected by a d-c transmission line FL.

Current sensors WA1 and WA2 generate two d-c currents $J_d$ at each both station indicative of the line current in the transmission line. Similarly, d-c voltages $U_d$ are measured at both stations by circuits PK1, PK2 parallel to TH1 and TH2, respectively, and are used as control parameters as explained below.

In the rectifier station GR, the d-c current $J_d$ is fed to a summing circuit SU1 through scaling member BG1 for forming a difference signal with a reference current. During normal operation, this reference current is equal to $J_W$. In case of disturbances, one of the currents is $J_{Byd}$, $J_{wmin}$ or $J_{WR}$, $J_{Byp}$ is chosen as a reference value for a bypass operation. (Normally $J_{Byp}$ is approximately equal to $J_{Nenn}/3$, wherein $J_{Nenn}$ corresponds to the normal or rated current over the transmission line.)

$J_{WR}$ corresponds to the current required by the inverters, to operate during a single-phase faults. $J_{Wmin}$ corresponds to the current on the line in the event of a total failure of the rectifier.

The current difference from summer SU1 is fed in parallel to threshold detector US, a dead time member tZ and to a summing circuit SU2. The output variable of dead time member TZ is fed, for forming a difference, to the summing circuit SU2 and, in addition, to the summing circuit SU3. Summing circuit SU3 also receives an output from the threshold detector US. The output of SU3 is connected to a current controller SR1. The current controller SR1 generates a current-dependent control angle A within the limits $A_{max}$ and $A_{min}$ and controls the firing point of a thyristor in rectifier TH1 via a subordinated function generator FG1 and pulse generator JG1.

The output variable of the summing circuit SU2 which occurs only in case of operating disturbances of the rectifiers, is fed via a differentiation stage DG1 and a switch SCH1, controlled via a time delay stage ZS, to a summing circuit SU4. SU4 also receives as inputs the sensed d-c voltage $U_d$ and a reference d-c voltage $U_W$ generated by a function generator FG3. The reference d-c voltage $U_W$ is derived in the function generator FG3 from the reference d-c current $J_W$ as a function of the network voltage $U_N$, the transformer transformation ratio $U_T$ and a quantity dx dependent on the inductances affecting communication (such as smoothing chokes, transformer reactances) as a function of the control angle. The output difference of the summing circuits SU4 is fed through a switch SCH5 and a differentiation member DG2, an integral control member, consisting of a controller DR1 and a setting motor M1. The motor M1 is controlled by switches $SCH_{max1}$ and $SCH_{min1}$ and is used to set the tap of a potentiometer PO1 connected to a constant voltage source (not shown). The output of the potentiometer PO1 is connected to limit setters $GG_{max1}$ and $GG_{min1}$ so that if either $J_w$ rises above $J_{wmax}$ or falls below $J_{wmin}$, the corresponding switch $SCH_{max1}$ or $SCH_{min1}$ opens the motor circuit. The signals from controller DR1 are further fed to an OR gate OV which opens the switch SCH1 via the time delay stage ZS as described above. The d-c reference current $J_W$ present at the tap of the potentiometer PO1 is fed to said function generator FG3 for forming the d-c voltage signal $U_W$. $J_W$ is also fed to a summing circuit SU5 which represents the initial stage of a reference current generater circuit VB. The output signal of circuit VB is fed as a reference current to a summing circuit SU1 mentioned above.

The reference current generator VB contains three minimum selection members MIN1, MIN2, MIN3. Each of these selection circuit MIN1, MIN2, MIN3, compares the two signals received at its inputs and generates an output equal to the lower of the input signals. The outputs of the two minimum selection members MIN1 and MIN2 are connected to the respective one input of the following minimum selection member MIN2 and MIN3 by a summing circuit SU6 and SU7. At a respective second input, a minimum selection members MIN1, MIN2, MIN3, receive reference d-c currents $J_{Byp}$, $J_{Wmin}$, $J_{WR}$ through respective summing circuits SU8, SU9, SU10. Each of summing circuits SU8, SU9, SU10 also receive a constant d-c current $J_K$ through switches SCH2, SCH3 and SCH4. These switches are in the position during normal operation and the reference d-c current $J_W$ is equal to the output of current of circuit VB, since the sum $J_{Byp} + J_K$, $J_{Wmin} + J_K$ and $J_{WR} + J_K$ each of which is larger than $J_W$.

In case of a relatively large current difference between the reference value $J_W$ and the actual value $J_d$ at the output of the summing circuit SU1 the difference signal is fed via the threshold detector and the summing circuit SU3, to the current controller SR1. If the difference signal is relatively small, it gets to the current controller SR1 delayed via the delaying dead time member TZ and the summing circuit SU3.

The rectifier station GR does not affect the voltage of the three-phase network feeding it since with each sensed d-c current $J_d$, a definite control angle A is generated in such a manner that, if the sensed d-c current $J_d$ is relatively small, control angle $A \geq 60'$. If the sensed d-c current $J_d$ is relatively large, control angle $A \leq 20'$ whereby the reactive control and commutation power changes less than, if a control angle A is preset independently of the current $J_d$.

By keeping the reactive power approximately constant, it is easier to maintain the network voltage constant.

To avoid control hunting, the time responses of the control member DR1, M1, PO1, $GG_{max1}$, $GG_{min1}$ must be matched to the current controller SR1 and the inverter TH2 in the inverter station.

The active power $P_d$ delivered to the three-phase network connected to the inverter station WR is determined by the inverter station WR by a power controller PR, which is provided in addition to a conventional extinction angle controller LR, a current controller SR2, and a voltage controller UR. The inverter station WR is likewise equipped with control assembly consisting of a three-level controller DR2, a setting motor M2 for setting the tap of a potentiometer PO2 as well as of voltage-dependent limit setters $GG_{max2}$, $GG_{min2}$ which controls switches $SCH_{max2}$ and $SCH_{min2}$ in the control circuit of the setting motor.

Potentiometer PO2, generates the reference d-c voltage $U_w$ which is fed to an summing circuit SU15, the output of which is connected to the input of a minimum selection member MIN5. A second input of the minimum selection member MIN5 is connected to the output of a summing circuit SU14, to which a quantity $U_{Wmin}$ is continuously fed on the input side. The second inputs of the two summing circuits can be switched by a switch SCH8 to a quantity $U_K > U_{max} > > U_{Wmin}$. The threelevel controller DR2, receives as an input the difference between the sensed d-c current $J_d$ fed to summing circuit SU13 from the sensor WA2 via a proportional member PG2 and the reference d-c current $J_W$ obtained at the output of a divider DI from the division of the active power $P_d$ by the actual d-c voltage Ud. The output of adding circuit SU13 is subjected to a further correction quantity in a manner described below. The actual d-c current $J_d$ is further fed to summing circuit SU12 in the input circuit of the current controller SR2 and to a multiplier MU, for simulating the active power Pd from the product $J_d \times U_d$. The two limit setters GGmax2 and GGmin2 also receive Ud as an input. The power $P_d$ at the output of the multiplier MU is conducted to summing circuit SU17. A reference value $P_W$ is added to $P_d$ in SU17 to form a difference quantity which gets to the input of the power controller PR. The output of the power controller PR is connected to the input of limit setters GGmax3 and GGMin3 as well as, via a limiter BG and a linear start-up generator HG2, to the summing circuit SU13.

For setting the respective power reference value $P_W$, a potentiometer PO3 is adjusted by a setting motor M3 and the output of the potentiometer tap is fed to the summing circuit SU17 and the input of a maximum selection member MAX2, the second input of which is receives a signal $P_{Wmin}$. Similarly maximum selection circuit M1 receives inputs $U_d$ and $U_{min}$. A maximum selection circuit compares the signals received at its input and generates a signal equal to the higher input signal. The outputs of the maximum selection members MAX1 and MAX2 are connected to the divider DI for forming the reference d-c current $J_W$. The output of the minimum selection member MIN5 is fed to a summing circuit SU16 the second input of which is connected to $U_d$. The output of the summing circuit SU16 is connected to the voltage controller UR.

The d-c voltage $U_d$ controlled at the inverter TH2 can be adjusted, together with the measured d-c current $J_d$, in such a manner that the desired active power $P_d$ is within a permissible power change range $\Delta P_{max}$.

The value $\Delta P_{max}$ is fed directly to the limit setter $GG_{max3}$ as well as to the limiter BG and via an inverting member UK to the limiter BG, and the limit setter $GG_{min3}$. The outputs of the two limit setters $GG_{max3}$ and $GG_{min3}$ are connected via time delay members ZG1 and ZG2 to a warning device MEL for the value $\Delta P_{max}$ to indicate whether the value $P_{max}$ has been exceeded.

The control circuit of the inverter TH2 is connected via a pulse generator IG2 and a function generator FG2 to the output of a fourth minimum selection member MIN4 which has three inputs, of which the one is connected to the extinction angle controller LR, the second one to the current controller SR2 and the third one to the voltage controller UR. To the input of the extinction angle controller LR, a summing circuit SU11 is connected which forms the difference of an actual value $j_d$ and a reference value $j_w$ of the extinction angle $\gamma$.

The summing circuit SU12 is connected on the input side the current controller SR2, reference current $J_{Byp}$ or the marginal current $J_{marg}$ (depending on the position of a switch SCH6) and the output of a starting-up generator HG1 are also fed to summing circuit 12. By actuating a switch SCH7 for the duration of a fault the output of the starting generator is forced to zero.

During normal operation, the rectifier TH1 must furnish a minimum d-c current $J_{dmin}$ which can be determined by a limit indicator, not shown. This current causes the three-level controller DR1 to approach a d-c voltage $U_d$ corresponding to the reference d-c current $J_w$ present, to which the rectifier TH1 can react in accordance with its $U_d$–$I_d$ correlation. A correction of the reference d-c current $I_W$ is then made at the inverter TH2, according to the reference power $P_W$ generated through, via the power controller PR until the $U_d$–$I_d$ correlation set by the rectifier TH1 with the $P_d$–$U_d$ correlation required by the inverter TH2 is fulfilled. If more active power is demanded, a change of the reference d-c current $J_W$ occurs immediately which leads via a three difference $J_W$–$J_d$ of the reference and sensed d-c current to a change of the d-c voltage $U_d$ and the d-c voltage change at the rectifier TH1 causes the corresponding supply of the d-c current $J_d$.

As can be seen from the description above for the inverter station WP, the voltage reference value $U_W$ of the HVDC system is formed via the three-level control DR2 from the comparison of $J_d$ with $J_w$. The reference d-c current $J_w$ in turn is obtained through division of the reference power $P_w$ by the sensed d-c voltage $U_d$.

Several advantages are achieved with this new method. Thus, the inverter TH2 itself determines the delivered power and the three-level control DR2 ensures the intrinsic safety of the control of the inverter, since increases of the d-c current $J_d$ beyond the respectively preset reference value $J_w$ automatically lead to a decrease of the d-c voltage $U_d$. In addition, the functions of the controllers LR and SR2 are retained. A special advantage is further the easier maintenance of the network voltage since the correlation of a smaller d-c voltage with a smaller power (current) causes a larger reactive power also in the inverter TH2 in the partial-load range because of the larger extinction angle j than in previously known control methods with a minimum extinction angle. Finally, the d-c voltage $U_d$, preset controlled at the inverter TH2 can be preset together with the measured d-c current $J_d$ via the superimposed power control in such a manner that the respectively demanded active power $P_d$ is kept accurately in the steady state.

Possible trouble cases will be discussed in the following and the operation of the control of the individual groups of the HVDS system will be explained.

In the case of 2- or 3-pole disturbance in the threephase network on the inverter side with a steep decline $SI_d/St \gg 0$ of the current, a bypass operation is initiated at the inverter TH2, in which the actual d-c voltage $U_d$ becomes almost zero $$\left( U_d \ll U\genfrac{}{}{0pt}{}{m}{\dim} / = 0.5 \genfrac{}{}{0pt}{}{U}{dn} \right).$$

The three-level controller DR2 is separated from the summing circuit SU13 by opening the switch SCH9 and the value of $U_d$ is held constant.

Falling of $U_d$ below $U_{dmin}$ if $J_d>0$ at the rectifier TH1 causes the setting of the reference current $J_{Byp}$ during the time that $J_d$ falls below $J_{dmin}$, since the switch SCH2 occupies the position b, in which $J_w+J_K>J_{Byp}$. therefore at the output of the minimum selection member MIN1, the parameter $J_{Byp}$ appears which is smaller than $J_{min}+J_K$ at the second output of the minimum selection member MIN2, $J_{Byp}$ likewise appears at the output of MIN2. Since $J_{Byp}$ is also smaller than $J_{WR}+J_K$ at the second input of the minimum selection member MIN3, the quantity $J_{Byp}$ ultimately, as already said, appears at the output of MIN3 as the reference comparison current.

By the reference/sensed current difference and the reduction of the actual d-c voltage $U_d$ due to the disturbance, the three-level control DR1 is addressed in the direction of a smaller reference d-c current and specifically control toward $J_{dmin}$ takes place with the said type of disturbance because $U_d<U_{dmin}=0.5\ U_{dn}$. After the 2- or 3-pole disturbance in said a-c network is corrected (recognizable by $U_d \gg U_{dmin}$), operation is resumed with the reference d-c current $J_{wmin}$.

Upon the appearance of the network voltage on the inverter side, the bypass operation is terminated, whereby the previous reference d-c voltage $U_w$ becomes operative again.

From the states $U_d \gg U_{dmin}$ and $I_d>0$, the rectifier TH1 recognizes the availability of the inverter TH2 and switches from $I_{Byp}$ operation to the three-level controller DR1 for the reference d-c current $J_w$.

In the case of a single-pole disturbance in the threephase network on the inverter side, the actual d-c voltage $U_{dmin}$ becomes effective within limits via the minimum selection member MIN4 and the switch SCH7 and the actual d-c voltage $U_{dmin}$ via the minimum selection member MIN5 and the voltage controller UR, and is set back again accordingly via the rectifier TH1.

After the single-pole fault in the respective network is switched off, the power controller PR is enabled again and the preceding reference d-c voltage $U_w$ is released also by switching the switch SCH8 back, whereby $U_d \gg U_{dmin}$, and the rectifier TH1 carries the corresponding current $J_d$.

A commutation failure on the inverter TH2 can thus be recognized at the rectifier station from the criteria $U_d \ll U_{dmin}$, $J_d>J_{dn}$ and the fast rise of $J_d$. Inverter operation without commutation failure is achieved by a temporary increase of the reference value of the extinction angle $\gamma j_w$, because the power controller PR is blocked for the duration of the increased extinction angle.

In case of a single-pole disturbance in the threephase network on the rectifier side, the switch SCH4 occupies the position b, in which case $J_w+J_K>J_{wr}$, so that the reference d-c current $J_{WR}$ appears at the putput of the minimum selection member MIN2.

The rectifier TH1 is accordingly run with the reference current $J_{WR}$ for the duration of the single-pole network disturbance. The d-c voltage appeariang in the process controls the reference d-c current $J_W$ via the three-level controller DR1 to a value for about one-half or two-thirds the nominal current $J_{dn}$. After said disturbance is eliminated, operation is resumed with this reduced actual value.

In case of a disturbance by a short circuit on the d-c side ($J_d>J_{dn}$), the switch SCH3 is brought into the position b in which $J_W+J_K>J_{Wmin}$. Since the relationship $J_{WR}+J_K>J_{Wmin}$ applies for the minimum selection member MIN3, the current $J_{Wmin}$ also appears at the output of the minimum selection member MIN3. Thus, the reference d-c current $J_{wmin}$ is present at the output of the minimum selection member MIN3, which switches the rectifier TH1 of the rectifier station GR into inverter operation. Because $V_d<0$ the reference d-c current $J_{wmin}$ is approached by the three-level controller DR1 (which is just above gap current), with which the rectifier TH1 starts again.

Interruptions on the FL line ($I_d=0$) as well as a shutdown of the system can be recognized if the value falls below $J_{wmin}$, where the reference d-c current $J_{wmin}$ is given via the three-level controller DR1.

Disturbances at the inverter TH2 can be recognized from the d-c voltage $U_d$ if the function generator FG3 of the rectifier TH1 is adjusted so that for $J_{wmin}$, approximately still one-half the nominal voltage $U_{dn}$ is associated. If the value falls below 0.5 $U_{dn}$, this indicates a disturbance of the inverter station WR if the three-phase network of its own station is in order.

In case of a 2- or 3-pole fault in the three-phase network supplying the rectifier station GR, the valves of TH1 are switched into bypass and the input to the three-level controller DR1 is interrupted. After said network fault is switched off, the current controller SR1 with the original reference value $J_w$ is released again.

Such a fault in the three-phase network on the rectifier side can be recognized in the inverter station WR from the criteria $U_d < U_{dmin}$, $J_d < J_w$ and $SJd/St < 0$; it switches the current controller SR2 in the inverter station WR to rectifier operation by setting $J_{Byp}$ via the switch SCH6. During said disturbance, the power controller TR is blocked. From the criterion $U_d > U_{dmin}$ which occurs, the inverter TH2 recognizes a fault-free operation of the rectifier TH1 if the fault in the three-phase network is eliminated. Through the switch SCH7, with the same excitation as SCH6, the starting-up generator HG1 is released after the switch SCH6 is switched back to $J_{marg}$ and brings the reference d-c current $J_w$ from zero to the value set by the three-level controller DR1.

In the inverter TH2, a short circuit on the d-c side cannot be distinguished from a multi-pole fault in the supplying three-phase network near the rectifier, since the rectifier TH1 can also suggest bypass oeration of the inverter TH2.

Thus, a short circuit on the d-c side in the rectifier and inverter causes a transition to rectifier operation with $J_{wmin}$ being constant, where, however, the short circuit current on the d-c side is extinguished. Time is used as a distinguishing additional criteria on, since network faults which initiate bypass control are switched off in not more than 500 ms. If the bypass operation exceeds this time interval appreciably (for instance, 1 sec) then both stations GR and WR are switched off and thereby, also feeding the fault is interrupted.

If the rectifier station GR reaches its limits $J_{dmin}$ or $J_{dmax}$, respectively, this is recognized by the inverter TH2 by addressing $U_{dmin}$ or $U_{dmax}$, respectively, without changing $J_d$ as well as by addressing the limitations of the power controller PR and the power reference value $P_w$ is set back, delayed in time, in a manner not shown so far that the output of the power controller PR is no longer subjected to a limitation. For the duration of $U_{dmax}$ and $U_{dmin}$, respectively, the limitation of Pd is indicated.

What is claimed is:

1. A method of controlling a high-voltage d-c transmission system between three-phase network-fed rectifier and inverter stations, comprising the steps of:
    forming a first reference d-c current from the difference of a reference current-dependent control angle function and a current controller dependent control angle on a rectifier side of the system, wherein the current controller is influenced by a difference of the first reference d-c current and an actual d-c current;
    setting a countervoltage as a function of the power on an inverter side of the system to thereby determine the actual d-c current;
    producing a second reference d-c current from division of a reference power by actual d-c voltage;
    producing on the inverter side a difference of the actual d-c current and the second reference d-c current to influence a level controller; and
    setting the second reference d-c current for a voltage controller on the inverter side via the level controller.

2. The method according to claim 1, further including determining the second reference current-dependent control angle function based on variables dependent on voltage changes in said three-phase network, wherein said variables include a transformation ratio of converter transformers.

3. The method according to claim 1, further comprising superimposing on the reference d-c current on the inverter side an additional quantity for compensating control inaccuracies and eliminating undesirable influences of network voltages and transformation ratios.

4. An arrangement of controlling a high-voltage d-c transmission system between three-phase network-fed rectifier and inverter stations, comprising:
    a first summing circuit having inputs which receives a measured d-c current and a reference d-c current to form a difference therefrom;
    a rectifier coupled to the summing circuit, said rectifier receiving said difference;
    a second summing circuit coupled to said first summing circuit to receive said difference;
    a function generator which produces a control angle function dependent on the reference d-c current, wherein a measured d-c voltage is compared in said second summing circuit with said control angle function, with the output of said second summing circuit being a control signal;
    an integral setting member coupled to said second summing circuit and controlled by said control signal;
    a potentiometer coupled to said integral setting member that supplies the reference d-c current, said reference d-c current being supplied to said function generator;
    a reference current generator circuit coupled to said first summing circuit, said reference current generator circuit receiving said reference d-c current;
    means for controlling power coupled to the inventor;
    an integral control member coupled to said means for controlling power;
    a potentiometer coupled to said integral control member that controls the voltage controller to influence the inverter; and
    a divider coupled to said integral control member which provides the measured d-c current by division of measured power and measured d-c voltage at the inverter.

* * * * *